United States Patent
Iaia

(10) Patent No.: US 9,593,979 B2
(45) Date of Patent: Mar. 14, 2017

(54) SCALE WITH DECOUPLING MECHANISM AND WINDSHIELD

(71) Applicant: Sartorius Lab Instruments GmbH & Co. KG, Goettingen (DE)

(72) Inventor: Aldo Iaia, Goettingen (DE)

(73) Assignee: Sartorius Lab Instruments GmbH & Co. KG, Goettingen (DE)

( * ) Notice: Subject to any disclaimer, the term of this patent is extended or adjusted under 35 U.S.C. 154(b) by 619 days.

(21) Appl. No.: 13/935,197

(22) Filed: Jul. 3, 2013

(65) Prior Publication Data

US 2013/0292192 A1 Nov. 7, 2013

Related U.S. Application Data

(63) Continuation of application No. PCT/EP2011/006237, filed on Dec. 10, 2011.

(30) Foreign Application Priority Data

Jan. 3, 2011 (DE) .................. 10 2011 000 011

(51) Int. Cl.
   *G01G 21/28* (2006.01)
   *G01G 23/02* (2006.01)

(52) U.S. Cl.
   CPC ........... *G01G 21/286* (2013.01); *G01G 21/28* (2013.01); *G01G 23/02* (2013.01)

(58) Field of Classification Search
   CPC ...... G01G 21/286; G01G 21/30; G01G 21/28; G01G 23/02
   See application file for complete search history.

(56) References Cited

U.S. PATENT DOCUMENTS

| | | | |
|---|---|---|---|
| 3,613,808 A * | 10/1971 | Bunnelle | 177/53 |
| 4,084,698 A * | 4/1978 | Niederer | 209/649 |
| 4,719,980 A | 1/1988 | Knothe et al. | |
| 4,842,084 A * | 6/1989 | Pirc | 177/145 |
| 4,932,486 A * | 6/1990 | Komoto et al. | 177/50 |
| 6,420,666 B1 * | 7/2002 | Baumeler et al. | 177/145 |
| 8,822,848 B2 * | 9/2014 | Meagher | 177/25.15 |
| 2008/0087474 A1 | 4/2008 | Nufer et al. | |

FOREIGN PATENT DOCUMENTS

| | | |
|---|---|---|
| DE | 3601408 C1 | 3/1987 |
| DE | 4236391 C1 | 2/1994 |
| DE | 102006008544 A1 | 8/2007 |

* cited by examiner

*Primary Examiner* — Randy W Gibson
(74) *Attorney, Agent, or Firm* — Edell, Shapiro & Finnan, LLC

(57) ABSTRACT

A scale with a weighing system (14), a weighing chamber (16) that is delimited by a windshield (18), and a drive for opening and closing the windshield (18). The scale has a load transferring part (32, 34) with which the weight of the load is transferred onto the weighing system (14). A decoupling mechanism is mechanically connected to the drive for rotating the windshield (18) such that the weighing system (14) is mechanically decoupled from the load transferring part in the load direction if the windshield (18) is open in order to not introduce transverse forces into the weighing system (14) during loading of the weight.

17 Claims, 5 Drawing Sheets

SCALE WITH DECOUPLING MECHANISM AND WINDSHIELD

The present application is a Bypass Continuation of International Application No. PCT/EP2011/006237, filed on Dec. 10, 2011, which claims priority from German Patent Application 10 2011 000 011.9, filed on Jan. 3, 2011. The contents of these applications are hereby incorporated into the present application by reference in their respective entireties.

FIELD AND BACKGROUND OF THE INVENTION

The invention relates to a scale that includes a weighing system, a weighing chamber that is delimited by a windshield, a load transferring part (which is usually the scale pan) that carries the weight of the load and which introduces the weight thereof into the weighing system, extending into the weighing chamber, and a drive for opening and closing the windshield.

A scale of this type is disclosed by DE 42 36 391 C1. This scale has a cylindrical, rotatable windshield, which includes a window at the peripheral wall, through which the weighing chamber can be accessed. In order to close the windshield, the windshield is rotated so that the window is aligned with a non-rotatable closing plate which is fixed to the housing and is pressed against the edge of the window, thereby closing the windshield.

DE 36 01 408 C1 (which corresponds to U.S. Pat. No. 4,719,980) discloses an analytical scale which has a weighing chamber accommodated in a housing, and is closable on an upper side by laterally movable plates so that a type of lock chamber is formed. In this scale, a lifting element is also provided for the scale pan so that during loading of the weight, the scale pan is decoupled from the weighing system. Particularly in the case of scales with extremely high resolution, to which the present invention relates, transverse forces which act during loading of the weight onto the scale pan and can hardly be avoided, negatively affect the weighing result. An offset occurs in the display and it takes some time before the scale settles, that is, reaches a stationary state. In order to avoid this effect, the lifting mechanism is provided.

OBJECTS AND SUMMARY OF THE INVENTION

It is an object of the invention to provide a high-resolution scale which displays a weighing result rapidly and precisely.

According to one formulation, this object is achieved with a scale of the aforementioned type having a mechanical decoupling mechanism connected to the drive, which decouples the weighing system mechanically from the load transferring part in the load direction when the windshield is opened and couples the weighing system in the load direction to the load transferring part when the windshield is closed.

The inventive scale uses the drive for opening and closing the windshield in order to derive therefrom the movement for the coupling and decoupling. The decoupling and coupling takes place in the load direction to prevent any transverse forces from arising. The load transferring part can be one of a plurality of parts arranged in the force transmission path between the weighing system and the scale pan or be the scale pan itself.

A preferred embodiment provides that the decoupling mechanism is a lifting mechanism for lifting and lowering the load transferring part. During lifting, the load transferring part is decoupled from the weighing system and vice versa.

The lifting mechanism mechanically converts, in particular, a rotary movement of the windshield into a lifting and lowering movement, so that a high degree of reliability and a low structural outlay can be achieved.

The lifting mechanism can have at least one ramp surface, but preferably has a plurality of gradient surfaces distributed about the central axis of the load transferring part. Said ramp surface or ramp surfaces are provided at one of two mutually opposing parts which rotate relative to one another, preferably at a weighing chamber base, for providing the lifting and lowering movement. Thus an axial lifting motion is derived via the ramp surface from the rotary motion.

The weighing chamber base is the removable plate-shaped or shell-shaped part which is arranged non-rotatably in the weighing chamber and lies beneath the scale pan.

In order to increase the ease of movement of the decoupling mechanism, according to one embodiment, the invention provides for a roller element which runs along the ramp surface, thereby reducing friction at the ramp surface.

Preferably, the roller element is mounted at a "coupling member" between a drive actuator and the windshield. The drive actuator is typically brought into rotation by the motor via a belt drive or some other gear mechanism. The windshield is typically removable from above and has an open base which is placed on the drive actuator and is rotatingly driven thereby via a form-fitting connection. The coupling member, which is firmly connected to the windshield, then ensures the mechanical connection between the windshield and the drive actuator.

According to a preferred embodiment, the coupling member is an annular base attached to the lower edge of the windshield and extending radially inwardly from the edge of the windshield.

The mounting of the roller element can be provided at a radially inwardly extending mounting plate at the coupling member.

The load transferring part can be arranged concentrically to a vertically movable lifting part which is arranged partially thereunder and is lifted and thus comes into contact with the load transferring part in order to raise and decouple the load transferring part. The concentric arrangement ensures that the load transferring part is precisely oriented in the load transferring direction and is lowered again in a precisely positioned manner.

In a preferred embodiment, the lifting part is the weighing chamber base, so that said base performs multiple functions.

As stated above, in a preferred embodiment, the invention provides that the load transferring part is a static scale pan.

The scale pan can have a plug which is formed onto its rear side and projects through the other parts, for example, the weighing chamber base, the support ring for the weighing chamber base and the drive actuator, extending as far as the weighing system in the housing of the scale. In general, the plug projecting from the rear side rests on the weighing system.

Good positioning during lowering is achieved in that the load transferring part is provided with a receptacle cone which rests on a post of the weighing system, from which the load transferring part is lifted off. This post is preferably also configured to be conical so that the receptacle and the post become centered to one another.

The post should penetrate deeper into the cone than the lift path between the raised position and the lowered position so that the post always remains within the cone, even when the load transferring part is raised, thereby ensuring that the two parts remain secured to one another laterally. As stated, during lowering, the parts become centered to one another, which is of decisive importance for the weighing result.

With regard to the windshield, the inventive scale is preferably configured similarly to the mechanism disclosed in DE 42 36 391 C1. A window in the windshield, which is rotatingly driven, is oriented with a non-rotatable closing plate for the window in the closed position. The closing plate is moved against the windshield in order to close said windshield. Preferably, the closing plate presses lightly against the edge of the window.

In order to realize precise motion in the load direction, the load transferring part should be contacted during decoupling at a plurality of sites around the central axis thereof, specifically by the part which moves said load transferring part.

BRIEF DESCRIPTION OF THE DRAWINGS

Further features and advantages of the invention are disclosed in the following description and the accompanying drawings to which reference is made and in which.

DETAILED DESCRIPTION OF EXEMPLARY EMBODIMENTS

Figure 1:
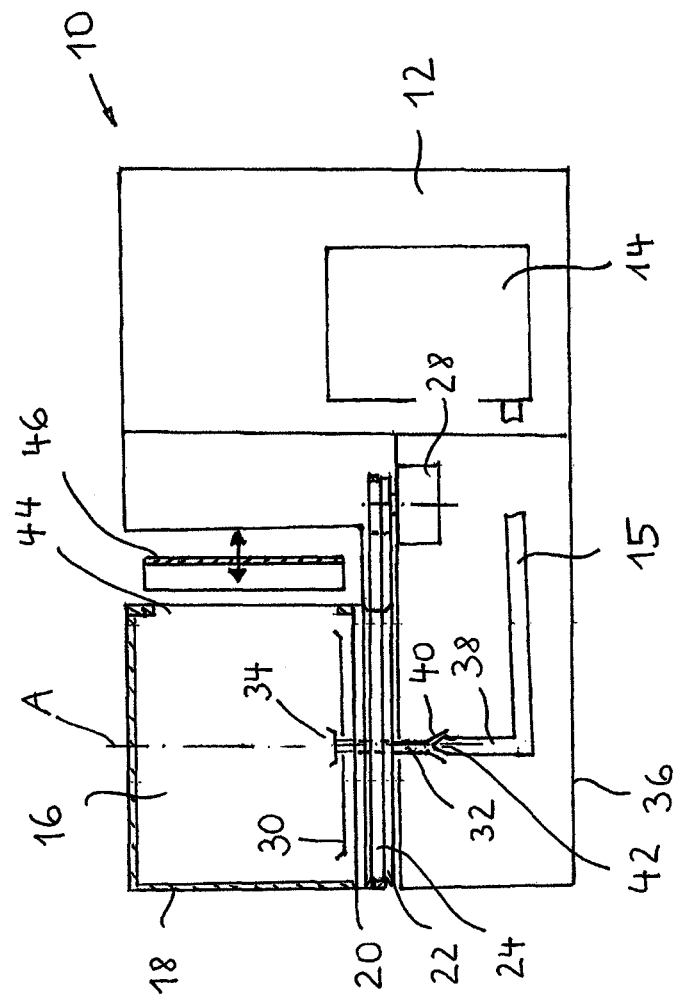
FIG. 1 is a schematic side view of the inventive scale.

FIG. 1 shows a high-resolution electronic scale 10. The scale 10 has several sections which are distinguished functionally, specifically a scale cell 12 with a weighing system 14 which includes, inter alia, a load boom arm 15 that extends out of the weighing cell 12 to beneath a weighing chamber 16. The weighing chamber 16 is outwardly delimited by a transparent windshield 18.

The windshield 18 has an inverted pot form with an open underside. The lower edge 20 of the windshield 18 is positioned directly or indirectly on a rotatable drive plate or rotary plate 22 which can be caused to rotate together with the windshield 18 by a drive 28 in the form of an electric motor, via a belt 24.

Provided in the interior of the weighing chamber 16 in the region of the base is a non-rotatable weighing chamber base 30 which can be removed upwardly and which has a central aperture through which a plug 32 of a scale pan 34 extends. The shell-like section of the scale pan 34 is arranged above the weighing chamber base 30, and the plug 32 extends from the underside of the shell-like section downwardly into a housing 36 of the scale and is aligned with a post 38 extending exactly vertically upwardly at the load boom arm 15.

The plug 32 has a conical recess 40 at the lower end thereof, into which the corresponding cone 42 at the free end of the post 38 extends from beneath.

The scale pan 34 together with the plug 32 thereof constitutes a load transferring part which transfers the weight applied by the body or substance to be weighed onto the scale pan 34 in the (vertical) load direction and conducts the load into the weighing system. For weighing purposes, the scale pan 34 lies with the receptacle cone 40 thereof on the post 38 without vertical play.

The windshield 18 has a window 44 via which the mass to be weighed can be introduced into the weighing chamber 16. For the actual weighing, the window 44 must be closed, and for this purpose, a closing plate 46 is provided which is preferably curved and which does not rotate with the windshield 18, but instead is mounted non-rotatably at the housing 36. However, the closing plate 46 can be moved radially in the direction toward the central axis A which forms the rotary axis, in order to be pressed against the edge of the window 44, to thereby close the window 44. For this purpose, a moving mechanism is provided which either comprises a separate motor or converts the movement of the windshield 18 into a lateral displacement motion, as described in DE 42 36 391 C1. The position shown in FIG. 1 is the position shortly before the windshield 18 is in the closed position and the closing plate 46 is moved against the window 44 thereof.

For opening, the windshield 18 is displaced by, for example, 90° relative to the position shown in FIG. 1 so that the window 44 is accessible laterally. At the start of the rotary movement, the closing plate 46 is brought into the opened position shown in FIG. 1 and the windshield 18 is rotated, driven by the motor, through the pre-determined angle.

In order to decouple the weighing system from the load in the opened position of the windshield 18 when the scale is loaded, a decoupling mechanism is provided, which will be described in greater detail with reference to the remaining drawings. In a preferred embodiment, this decoupling mechanism is configured as a lifting mechanism for raising and lowering the load transferring part, in this case the scale pan 34.

The lifting mechanism converts a rotary movement of the windshield 18 into a raising and lowering movement of the scale pan 34.

Figure 2:
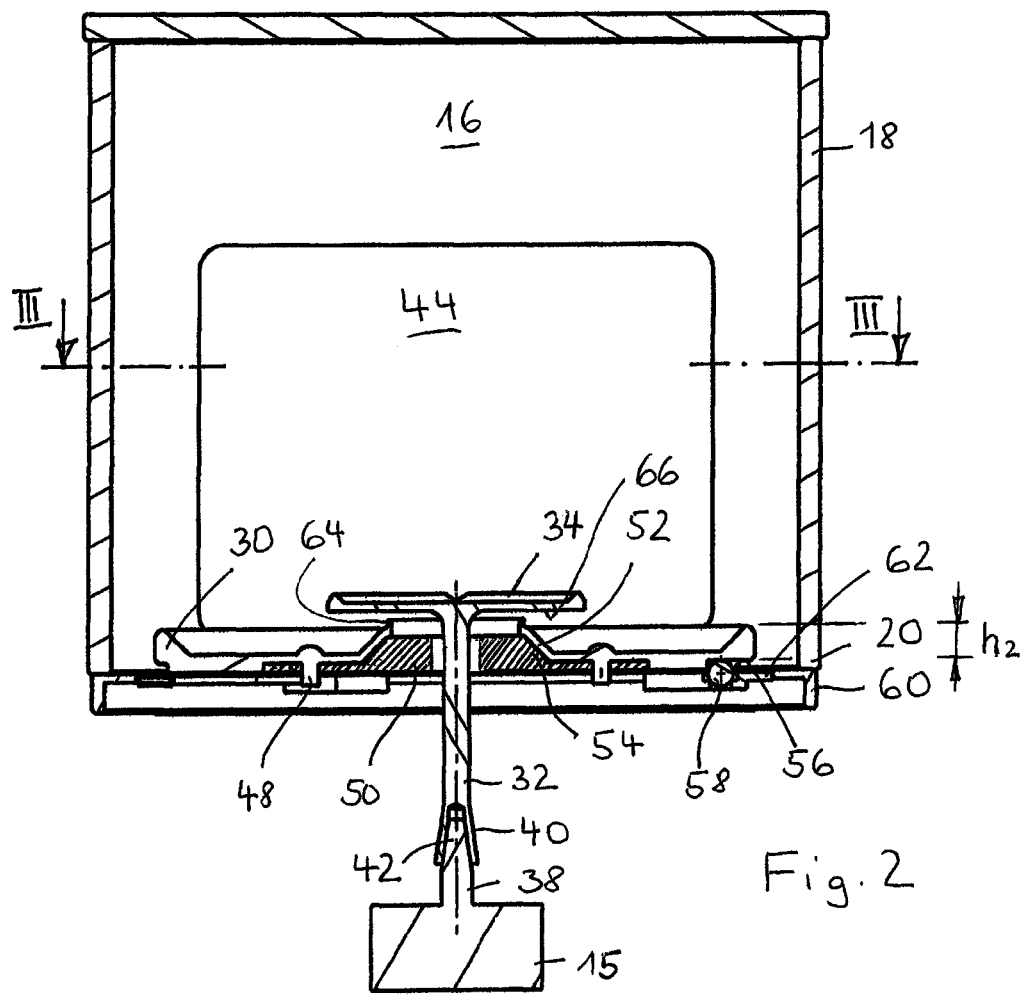
FIG. 2 is a schematic sectional view of the scale of FIG. 1 with the windshield closed.
Figure 4:
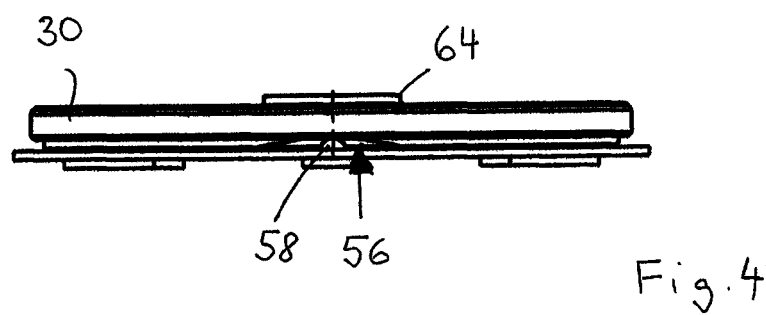
FIG. 4 is a side view of several parts in the region of the base of the windshield, with the windshield closed.

In FIG. 2, the windshield 18 is shown in the closed state in which the window 44 faces rearwardly. Further details are also visible. Beneath the shell-like section of the scale pan 34, the weighing chamber base 30 can be seen, having projections 48 on the rear side thereof which extend into apertures in a support ring 50. The support ring 50 is visible only partially in FIG. 2 and has a sleeve-shaped downwardly extending section (not shown) with which said the support ring 50 is firmly mounted on the housing side. The support ring 50 is static, and thus does not rotate. The weighing chamber base 30 is also prevented by the projections 48 from rotating at all.

The weighing chamber base 30 has a central aperture through which the plug 32 extends and the edge of which is configured in the form of a cone 52. The cone 52 is matched to the cone 54 of the support ring, so that the support ring 50 centers the weighing chamber base 30 via the cones 52, 54.

The underside of the weighing chamber base 30 is not configured planar, but has a plurality of ramp surfaces 56 shaped as circular segments. The ramp surfaces 56 cooperate with a part which moves relative thereto and runs along the respective ramp surface 56. In the embodiment shown, roller elements 58, in this case spheres, on which the ramp surfaces 56 lie are provided.

The roller elements 58 are mounted on a coupling member 60 which is attached to the edge 20 of the windshield 18 and couples the windshield 18, in a rotary driving manner, to the rotary plate 22 (the rotary plate 22 being omitted from FIGS. 2 to 7, for clarity). The coupling member 60 is an annular disk which extends radially downwardly from the edge 20 and radially inwardly. The coupling member 60 has finger-like mounting plates 62 at which the roller elements 58 are mounted.

The coupling element 60 provides a type of base for the windshield 18. One or more projections at the coupling member 60 or at the rotary plate 22 come into engagement with corresponding recesses in the other of the two parts in order to ensure mutual rotation.

In the closed position of the windshield 18 as shown in FIG. 2, the roller elements 58 are arranged so as to contact the lowest sections of the ramp surfaces 56. In this position, the weighing chamber base 30 is in the lowered position, in which the base is spaced apart, in the region of the upper peripheral edge 64 of the cone 52, from the underside 66 of the shell-shaped section of the scale pan 34. In this state, the receptacle cone 40 also lies on the cone 42 of the post 38 and, in this state, weighing takes place.

Figure 3:
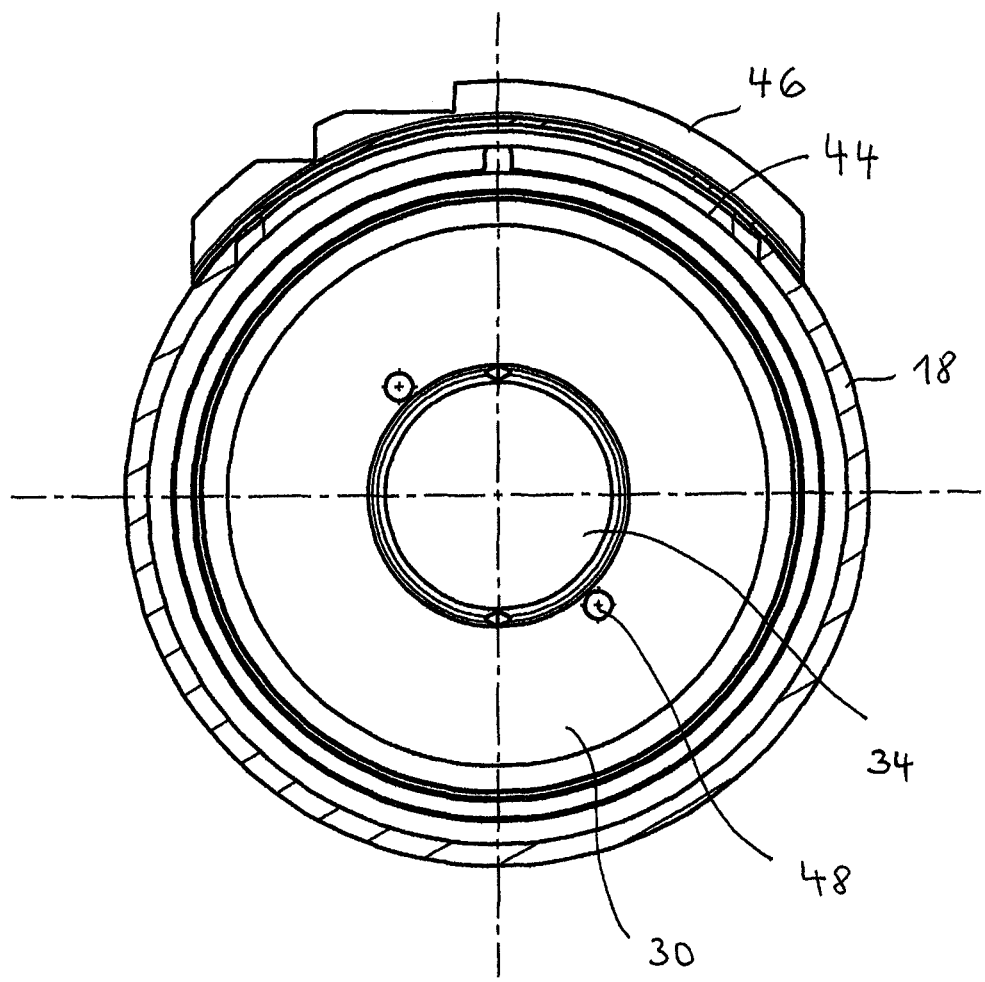
FIG. 3 is a horizontal partial sectional view along the line III-III of FIG. 2.

FIG. 3 shows that the closing plate 46 lies against the edge of the window 44.

Figure 5:
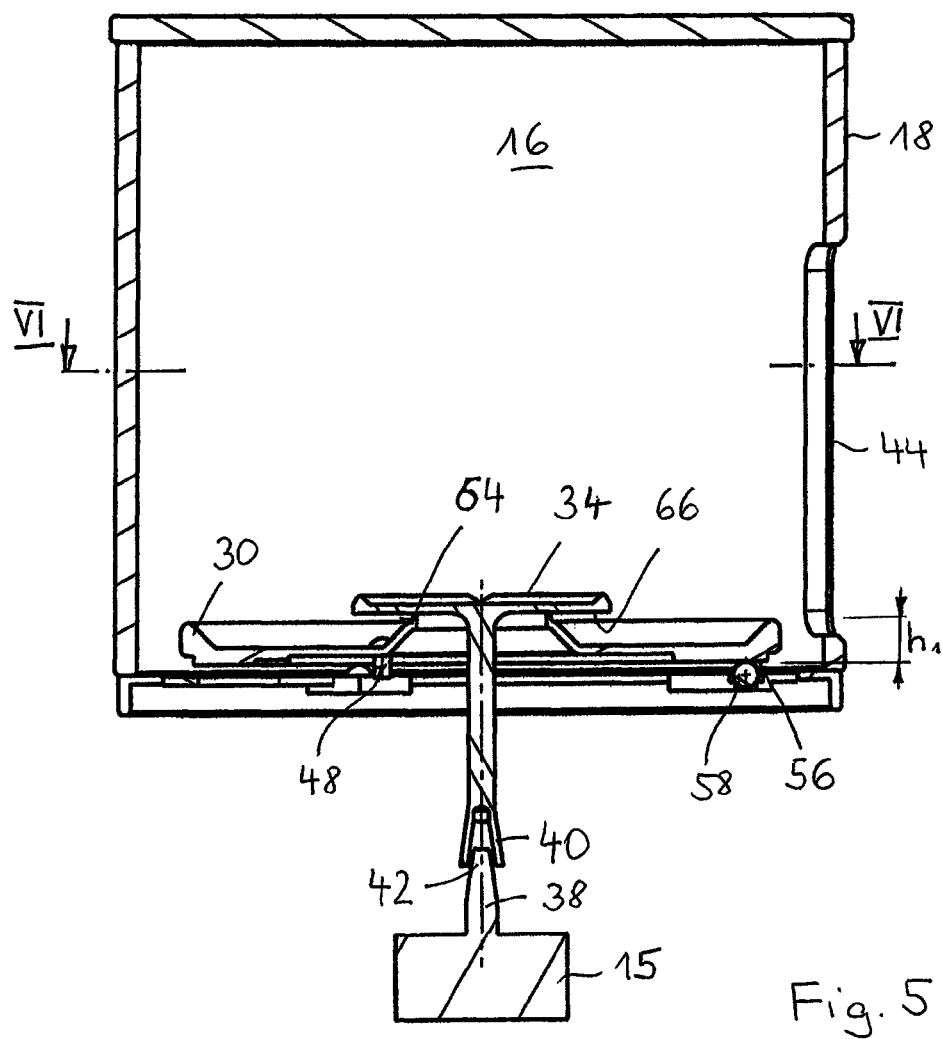
FIG. 5 is a schematic sectional view of the scale with the windshield open.
Figure 7:
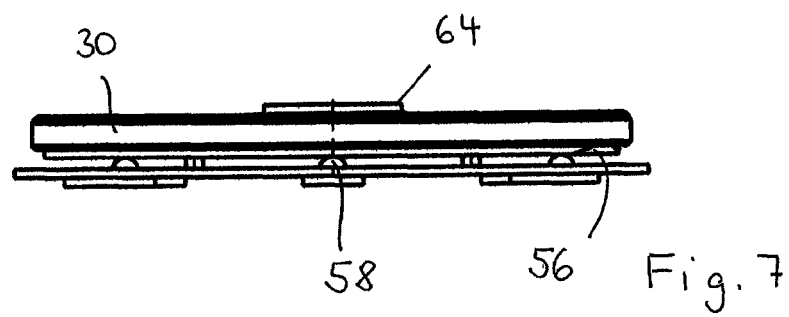
FIG. 7 is a schematic side view of several parts in the region of the windshield base, with the windshield open.
Figure 6:
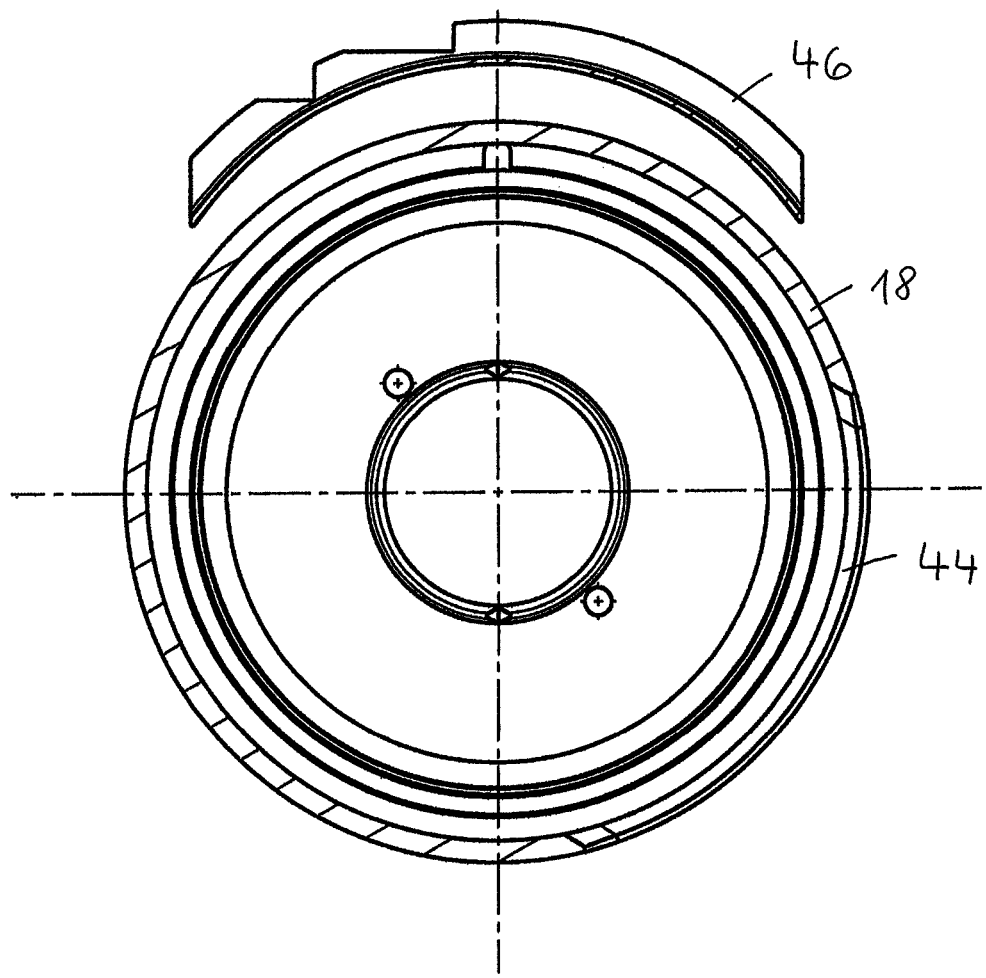
FIG. 6 is a horizontal partial sectional view along the line VI-VI of FIG. 5.

However, if the weighing chamber is loaded or emptied, the windshield 18 is moved, using the motor, into the open position in which the window 44 is oriented sideways (see FIG. 5). A vertical lift movement is derived, via the ramp surfaces 56, from this rotary movement of the windshield 18. Rotation of the rotary plate 22 also causes the coupling member 60 to rotate about the axis A. Thus the roller elements 58, which are support points for the weighing chamber base 30, also travel about the axis A and along the associated ramp surfaces 56.

The height difference in the vertical direction which the ramp surfaces 56 have between the highest point and the lowest point can be regarded as the difference between the heights $h_1$ and $h_2$ in FIGS. 2 and 5. Thus, during rotation, the roller elements 58 travel into sections of the ramp surfaces 56 which are positioned higher, with the result that the weighing chamber base 30 is thereby raised. However, the weighing chamber base 30 does not rotate, due to the projections 48 because these projections remain in engagement with the support ring 50. During the movement of the weighing chamber base 30, the peripheral edge 64 of the cone 52 comes into contact, vertically upwardly, with the underside 66 of the scale pan 34 and raises the scale pan 34 so that the receptacle cone 40 is decoupled from the post 38 in the vertical direction. However, the post 38 remains laterally within the receptacle cone 40, as FIG. 5 shows. The weighing chamber base 30 acts as a lifting member.

In this raised position, the scale is loaded. All weight forces and transverse forces acting on the scale pan 34 during loading or unloading of the weighing chamber 16 are conducted directly into the weighing chamber base 30 and are prevented from acting on the weighing system 14. This is due to the decoupling in the load direction and in the transverse direction, because a lateral gap is maintained between the receptacle cone 40 and the cone 42 of the post 38.

In order to weigh the load applied, the windshield 18 is closed and set in rotation once again. During this process, the roller elements 58 travel effectively downwardly on the respective associated ramp surfaces 56, so that both the weighing chamber base 30 and the scale pan 34 are lowered slowly and evenly. Finally, a gap forms again between the edge 64 of the cone 52 and the underside 66 of the scale pan 34, and the receptacle cone 40 lies against the cone 42 again. During this downward movement, all the parts become centered to one another through operation of the various cones.

Due to the precise placement of the scale pan 34 on the weighing system 14 in the force conducting direction, disturbing influences due to transverse forces are prevented. The lowering of the scale pan 34 which can be achieved with a high degree of reproducibility leads to minimal disturbances of the weighing system. The relatively minor disturbances decline very rapidly and, above all, can be effectively filtered out.

The above description of various embodiments has been given by way of example. From the disclosure given, those skilled in the art will not only understand the present invention and its attendant advantages, but will also find apparent various changes and modifications to the structures and methods disclosed. The applicant seeks to cover all such changes and modifications as fall within the scope of the invention, as originally disclosed and defined by the appended claims.

The invention claimed is:

1. A scale comprising:
   a weighing system,
   a weighing chamber which is delimited by a windshield and into which a load transferring part projects, wherein the load transferring part accepts the weight of a load and introduces the weight into the weighing system in a load direction,
   a drive for opening and closing the windshield, and
   a decoupling mechanism which mechanically interconnects the windshield and the load transferring part, and which is configured to decouple the weighing system from the load transferring part in the load direction in response to an opening of the windshield and is configured to couple the weighing system in the load direction to the load transferring part in response to a closing of the windshield.

2. The scale as claimed in claim 1, wherein the decoupling mechanism comprises a lifting mechanism for lifting and lowering the load transferring part.

3. A scale comprising:
   a weighing system,
   a weighing chamber which is delimited by a windshield and into which a load transferring part projects, wherein the load transferring part accepts the weight of a load and introduces the weight into the weighing system in a load direction,
   a drive for opening and closing the windshield, and
   a decoupling mechanism which decouples the weighing system from the load transferring part in the load direction when the windshield is opened and couples the weighing system in the load direction to the load transferring part when the windshield is closed,
   wherein the decoupling mechanism comprises a lifting mechanism for lifting and lowering the load transferring part, and
   wherein the lifting mechanism mechanically converts a rotary movement of the windshield into a lifting or lowering movement.

4. The scale as claimed in claim 3, wherein the lifting mechanism comprises a ramp surface at one of two mutually opposing parts which rotate relative to one another.

5. The scale as claimed in claim 4, wherein the lifting mechanism further comprises a roller element which runs along the ramp surface.

6. The scale as claimed in claim 5, wherein the coupling member is an annular base attached to a lower edge of the windshield and extending radially inwardly from the edge, the annular base comprising at least one radially inwardly extending mounting plate for the roller element.

7. The scale as claimed in claim 1, wherein the load transferring part is arranged concentrically to a vertically movable lifting part which is arranged partially under the load transferring part and is lifted and comes into contact with the load transferring part.

8. The scale as claimed in claim 7, wherein the lifting part is secured against twisting.

9. The scale as claimed in claim 1, wherein the load transferring part comprises a scale pan.

10. The scale as claimed in claim 9, wherein the scale pan has a rearwardly projecting plug which, in the coupled position, rests against the weighing system.

11. The scale as claimed in claim 1, wherein the load transferring part rests with a receptacle cone on a post of the weighing system in the coupled position, and wherein the post is separated from the receptacle cone of the load transferring part in the decoupled position.

12. A scale comprising:
a weighing system,
a weighing chamber which is delimited by a windshield and into which a load transferring part projects, wherein the load transferring part accepts the weight of a load and introduces the weight into the weighing system in a load direction,
a drive for opening and closing the windshield, and
a decoupling mechanism which mechanically interconnects the windshield and the load transferring part, and which decouples the weighing system from the load transferring part in the load direction when the windshield is opened and couples the weighing system in the load direction to the load transferring part when the windshield is closed,
wherein the windshield has a window and the windshield is driven by the drive to open and close by rotating.

13. A scale comprising:
a weighing system,
a weighing chamber which is delimited by a windshield and into which a load transferring part projects, wherein the load transferring part accepts the weight of a load and introduces the weight into the weighing system in a load direction,
a drive for opening and closing the windshield, and
a decoupling mechanism which decouples the weighing system from the load transferring part in the load direction when the windshield is opened and couples the weighing system in the load direction to the load transferring part when the windshield is closed,
wherein the load transferring part is contacted during decoupling at a plurality of sites around the central axis thereof.

14. The scale as claimed in claim 4, wherein the two mutually opposing parts are configured to rotate relative to one another at a weighing chamber base for creating the lifting or lowering movement.

15. The scale as claimed in claim 5, wherein the roller element is mounted at a coupling member between a drive actuator and the windshield.

16. The scale as claimed in claim 7, wherein the lifting part comprises a weighing chamber base.

17. The scale as claimed in claim 12, further comprising a non-rotatable closing plate for the window, which is configured to move radially against the windshield when the windshield is driven to rotate closed.

* * * * *

UNITED STATES PATENT AND TRADEMARK OFFICE
CERTIFICATE OF CORRECTION

Page 1 of 1

PATENT NO. : 9,593,979 B2
APPLICATION NO. : 13/935197
DATED : March 14, 2017
INVENTOR(S) : Aldo Iaia It is certified that error appears in the above-identified patent and that said Letters Patent is hereby corrected as shown below:

In the Claims

In Claim 6, Line 1 change "claim 5" to --claim 15--.

Signed and Sealed this
Thirty-first Day of October, 2017

Joseph Matal
*Performing the Functions and Duties of the
Under Secretary of Commerce for Intellectual Property and
Director of the United States Patent and Trademark Office*